UNITED STATES PATENT OFFICE.

GEORGE H. KING AND GERALD I. ROBERTS, OF PORT ARTHUR, TEXAS, ASSIGNORS TO GULF REFINING COMPANY, OF PITTSBURGH, PENNSYLVANIA, A CORPORATION OF TEXAS.

MANUFACTURE OF ALUMINUM CHLORID.

1,308,080.      Specification of Letters Patent.      Patented July 1, 1919.

No Drawing.      Application filed April 10, 1919. Serial No. 289,116.

*To all whom it may concern:*

Be it known that we, GEORGE H. KING and GERALD I. ROBERTS, citizens of the United States, residing at Port Arthur, in the county of Jefferson and State of Texas, have invented certain new and useful Improvements in Manufacture of Aluminum Chlorid, of which the following is a specification.

This invention relates to the manufacture of aluminum chlorid; and it comprises a method of making aluminum chlorid wherein producer gas, as free from carbon dioxid as may be and at the high temperature of production, is mingled with chlorin and the mixture contacted with alumina in a high temperature chamber to produce vapors of aluminum chlorid, these vapors being subsequently condensed in any suitable manner; all as more fully hereinafter set forth and as claimed.

Aluminum chlorid, which is a freely volatile material, may be made from aluminum oxid or alumina (bauxite) by mixing it with carbon and treating with chlorin at a high temperature. The oxygen of the alumina goes to the carbon, while the aluminum and chlorin unite to form vapors of aluminum chlorid. On cooling the gases the aluminum chlorid is condensed and separated and may be regained. While this reaction, which is an old and well known one, is simple in principle, it is difficult to carry out in practice. Most of the difficulties are heating difficulties. The temperature required for reaction is quite high, being above red heat, although no great volume or amount of heat is necessary. But heating any great amount of a mixture of alumina and carbon as a body pervious enough to allow chlorin to pass through it in a retort is difficult for the reason that there are few retort materials which will withstand the action of chlorin, of carbon and of aluminum chlorid at a high temperature. Large retorts must be used in order to have any substantial output; and the larger the retort, the greater are the difficulties of heating the charge.

The usual assumption is that in the reaction stated the oxygen of the alumina goes to the carbon to form carbon monoxid which passes off with the vapors of the aluminum chlorid. We have found that this impression is incorrect in that some or all of the carbon instead of forming carbon monoxid forms carbon dioxid, giving much more available heat or energy for the reaction. Roughly speaking, in oxidation of carbon to monoxid only 30 per cent. of the total heat is evolved, the other 70 per cent. becoming liberated on the formation of dioxid from the monoxid. To the extent therefore that carbon dioxid is formed in the production of the aluminum chlorid more "driving energy" is available than is commonly supposed; and less carbon is necessary than is ordinarily employed. With less carbon in the mix, there is less material to be heated. In fact, with a mixture of carbon monoxid and chlorin, or, which is the same thing, with phosgen ($COCl_2$) in the presence of heat, no carbon need be used with the alumina.

In the present invention these facts are utilized, aluminum chlorid being formed by passing a mixture of carbon monoxid and chlorin over alumina (bauxite) in the presence of heat. This alumina may or may not contain carbon; but usually more or less is so admixed. Ordinarily we briquet the alumina with more or less petroleum coke or other form of carbon low in ash. The heat necessary for the reaction may be imparted through a retort wall, or some of it; but usually, for the reasons mentioned, it is better not to try to do more than heat the reaction chamber enough to compensate for radiation. Most or all of the heat is better imparted as preheat to the reacting materials. The bauxite briquets may be heated in any convenient manner; and the mixed gases may be so heated. It is convenient to use producer gas as a source of CO.

Ordinary producer gas is made by passing air through ignited carbon, giving a more or less variable mixture of nitrogen, carbon monoxid and carbon dioxid at a temperature ranging anywhere from 650° C. to perhaps 1300 to 1400° C. With bituminous coal there may be more or less hydrogen, hydrocarbon, tar, etc., present but with fixed carbon, such as anthracite, coke, etc., the gas is composed, as stated, of nitrogen, carbon monoxid and carbon dioxid. The higher the temperature at which the producer gas leaves the carbon the less is the percentage of carbon dioxid and at temperatures above 1000°

C. the proportion of dioxid is negligible; that is, gas made at over 1000° C. from fixed carbon and air contains practically only nitrogen and carbon monoxid.

We find by taking hot producer gas and simply mixing chlorin with it, that on passing the mixture over alumina we can form and distil away aluminum chlorid. The alumina may be preheated. The higher the temperature of the producer gas, and the freer it is of carbon dioxid, the less is the necessity for the addition of heat from any other source. The greater the proportion of carbon dioxid in the mixture of the gases fed to the reaction chamber the less is the tendency of carbon monoxid to oxidize at the expense of alumina to form carbon dioxid. Also, with carbon in the charge and with much carbon dioxid in the gas there is a tendency for the reduction of the carbon dioxid to carbon monoxid by the carbon with absorption of heat; there is, so to speak, a chemical chilling due to the presence of carbon dioxid. For the stated reasons therefore we find it advantageous to work with a producer gas made at as high a temperature as possible not only because of the greater amount of sensible heat it carries forward for use in the reaction but because more of that heat is available.

In a practical embodiment of the present process we briquet alumina with or without the addition of carbon, but usually with it. A little tar, heavy oil or the like may be used in briqueting. The briquets may or may not be preheated in any convenient way. Usually we preheat them more or less. Preheating may be done in any ordinary baking furnace or device; or the briquets of bauxite and coke may be heated and fired; that is, allowed to undergo an incipient combustion to heat them up. As the proportion of carbon present is not of great importance in the present invention such a method of heating is feasible. The hot briquets are placed in any convenient type of reaction chamber which may or may not be heated. Ordinarily it is convenient to supply a little outside heat to the chamber; but more for the purpose of preventing cooling than for the purpose of heating the reaction material. Producer gas is made in the ordinary way using any convenient form of fixed fuel, such as coke or petroleum coke, and while still hot is admixed with chlorin. Cold chlorin may be used. The mixture is sent through the mass of briquets in the reaction chamber to produce aluminum chlorid and the vapors of aluminum chlorid are recovered by cooling in any convenient manner. Where the bauxite contains much iron, ferric chlorid usually forms first. It may be separately condensed.

In making producer gas, operation with fuels rich in ash is ordinarily controlled so as to have low temperatures, thereby avoiding difficulties with clinker, slag, etc., endothermics, such as steam or products of combustion being used to keep the temperature down. For our purposes however we desire a high temperature gas and therefore find it better to work with fuels not containing much ash, such as petroleum coke. If fuels high in ash must be used, the producer may be so constructed as to make presence of clinker immaterial or it may be operated as what is known as a slagging producer. In a slagging producer, a little lime or limestone, and sometimes some preformed slag, may be employed in admixture with the fuel; and the temperature is raised to a point where the ash is slagged and melted, so that it may be tapped off. With a slagging producer, gas temperatures over 1000° C. may be attained. The temperature at which gas leaves the fuel mass however of course depends upon the design; the longer the column of fuel, the colder is the gas.

As stated, the presence of carbon in the reaction mixture is not necessary for the reaction. Nevertheless, we ordinarily find it convenient to use carbon in the briquets. There is the advantage that as the reaction goes forward and the alumina disappears the briquet is maintained in a more or less coherent form by the carbon. Without the use of carbon, as the reaction goes forward, the bauxite tends to break down into a pulverulent form which goes forward as dust. This is mechanically inconvenient. The presence of carbon also allows preheating by firing.

In many methods of treating petroleum oils with aluminum chlorid, after a time the activity of the aluminum chlorid diminishes or ceases and it is deposited in the form of a black asphaltic or coky mass containing aluminum and chlorin but also containing hydrocarbons, carbon, etc. Material like this may be used in connection with the bauxite as it furnishes a convenient binding agent and also gives aluminum chlorid under the action of the chlorin and the heat.

Instead of using briquets, lump bauxite may be employed. But we find the briqueting with carbon more advantageous because of the tendency of bauxite to break down into dust.

What we claim is:—

1. The process of producing aluminum chlorid which comprises mingling hot producer gas with chlorin, contacting the mixture with alumina and cooling to recover vapors of aluminum chlorid.

2. The process of producing aluminum chlorid which comprises mingling producer gas at a temperature in excess of 1000° C. with chlorin, contacting the mixture with alumina and cooling to condense vapors of aluminum chlorid.

3. The process of producing aluminum chlorid which comprises mingling hot producer gas with chlorin, contacting the mixture with alumina and carbon and cooling to recover vapors of aluminum chlorid.

4. The process of producing aluminum chlorid which comprises mingling producer gas at a temperature in excess of 1000° C. with chlorin, contacting the mixture with alumina and carbon and cooling to condense vapors of aluminum chlorid.

In testimony whereof, we affix our signatures hereto.

G. H. KING.
GERALD I. ROBERTS.